United States Patent
Spertus et al.

(10) Patent No.: US 7,707,555 B2
(45) Date of Patent: *Apr. 27, 2010

(54) INTERACTIVE DEBUGGING SYSTEM WITH DEBUG DATA BASE SYSTEM

(75) Inventors: Michael P. Spertus, Chicago, IL (US); Charles Fiterman, Deerfield, IL (US); Gustavo Rodriguez Rivera, West Lafayette, IN (US)

(73) Assignee: Symantec Operating Corporation, Mountain View, CA (US)

( * ) Notice: Subject to any disclaimer, the term of this patent is extended or adjusted under 35 U.S.C. 154(b) by 755 days.

This patent is subject to a terminal disclaimer.

(21) Appl. No.: 11/091,602

(22) Filed: Mar. 28, 2005

(65) Prior Publication Data

US 2005/0172271 A1    Aug. 4, 2005

Related U.S. Application Data

(63) Continuation of application No. 09/529,760, filed as application No. PCT/US98/22923 on Oct. 28, 1998, now Pat. No. 6,938,245.

(60) Provisional application No. 60/063,992, filed on Oct. 29, 1997.

(51) Int. Cl.
*G06F 9/44* (2006.01)

(52) U.S. Cl. ............... 717/127; 717/124; 717/125; 717/131

(58) Field of Classification Search ........... None
See application file for complete search history.

(56) References Cited

U.S. PATENT DOCUMENTS 4,589,068 A * 5/1986 Heinen, Jr. ........... 717/127

(Continued)

FOREIGN PATENT DOCUMENTS

EP    0 729 097    8/1996

(Continued)

OTHER PUBLICATIONS

Purify: Fast Detection of Memory Leaks and Access Errors, http://www.rational.com/support/techpapers/fast_detection/ (admitted prior art).

(Continued)

*Primary Examiner*—Chuck O Kendall
(74) *Attorney, Agent, or Firm*—Lawrence J. Merkel; Meyertons, Hood, Kivlin, Kowert & Goetzel, P.C.

(57) ABSTRACT

An interactive system for debugging programs in which a persistent data base system responds to update queries containing debugging information from a debugging information source and to read queries on the debugging information from an interactive interface. The interactive interface produces the read queries in response to inputs from users and formats the results of the read queries as required by the user. One source of inputs is a standard Web browser for which the interactive interface functions as a Web server. The system also includes a command channel by which the source of debugging information receives commands from the interactive interface. In one embodiment, the command channel is implemented in the data base. In a disclosed implementation, the source of debugging information provides memory debugging information. Also disclosed are techniques for using an automatic memory management system to reduce memory fragmentation and heap footprint size.

13 Claims, 11 Drawing Sheets

U.S. PATENT DOCUMENTS

| | | | |
|---|---|---|---|
| 5,261,044 A | | 11/1993 | Dev et al. |
| 5,361,351 A | * | 11/1994 | Lenkov et al. ............... 717/124 |
| 5,408,650 A | * | 4/1995 | Arsenault ................... 717/124 |
| 5,412,799 A | * | 5/1995 | Papadopoulos .............. 703/22 |
| 5,450,586 A | | 9/1995 | Kuara et al. |
| 5,513,317 A | | 4/1996 | Borchardt et al. |
| 5,535,329 A | | 7/1996 | Hastings |
| 5,553,235 A | * | 9/1996 | Chen et al. ................... 714/20 |
| 5,561,763 A | | 10/1996 | Eto et al. |
| 5,953,530 A | | 9/1999 | Rishi et al. |
| 5,956,479 A | * | 9/1999 | McInerney et al. ............ 714/38 |
| 5,999,734 A | | 12/1999 | Willis et al. |
| 6,202,199 B1 | | 3/2001 | Wygodny et al. |
| 6,230,312 B1 | | 5/2001 | Hunt |
| 6,253,368 B1 | | 6/2001 | Nelin |
| 6,324,683 B1 | * | 11/2001 | Fuh et al. .................... 717/124 |
| 6,938,245 B1 | | 8/2005 | Spertus et al. |
| 2001/0021985 A1 | * | 9/2001 | Aldridge et al. ............... 714/38 |

FOREIGN PATENT DOCUMENTS

WO          96/38733         12/1996

OTHER PUBLICATIONS

BoundsChecker Basics, Compuware Corporation, Copyright© 1998, Compuware Corporation (admitted prior art).

Using Rational Developer Products, Purify, PureCoverage, PureLink, and Quantity with SunSoft's Visual Workshop, http://www.rational.com/support/techpaers/sunsoft/ (admitted prior art).

SmartDebugging for Component-based, Multi-language Software Environments, http://www.numega.com/library/papers/smart_debug.shtml (admitted prior art).

Scholten, J., et al., "Monitoring Multimedia Systems," Distributed Computing Systems, 1992, Proceedings of the Third Workshop on Future Trends of Taipei, Taiwan, Apr. 14-16, 1992, pp. 377-380.

Preliminary Search Report from PCT/US98/22923 dated Apr. 23, 2009.

* cited by examiner

Update Settings — 803

| ID | Setting | Description |
|---|---|---|
| 805 | gcEnableFree | A value of 1 will cause explicit calls to free () and delete to reclaim memory. |
| 807 | gcPriority | A larger value (70-100) will reduce the frequency of garbage collections but increase heap size, and a smaller number (<30) resilt in a smaller heap but more collections. |
| 809 | gcPrintStats | A value of 1 causes Great Circle to Periodically print statistics to gcLog. |
| 811 | gcLogAllLeaks | A value of 1 will make Great Circle write all leaks to the log. |
| 813 | gcMaximumLeaksToLogFile | Sets the maximum number of leaks reported to the log. |
| 815 | gcAllowUserStacks | READ ONLY: A value of 1 indicates that your program implements its own user-level thread libraries that change the stack location. |
| 819 | gcCollections | READ ONLY: The number of complete cycles that have occured during the program. |
| 821 | gcCollectAtEnd | A value of 1 tells GCTransparent to run a collection cycle at program exit. |
| 823 | gcNotTransparent | A value of 1 tells the Great Circle not to automatically schedule garbage collection. |
| 825 | gcShowStackTrace | A value of 1 tells the Great Circle to annotate objects with stack trace information. |
| 827 | gcShowStackTraceLimit | Sets the maximum number of stack levels that the Great Circle debugger will keep track of. |
| 829 | gcLogFile | |

Update Settings — 803

Fig. 8

INTERACTIVE DEBUGGING SYSTEM WITH DEBUG DATA BASE SYSTEM

CROSS REFERENCES TO RELATED APPLICATIONS

The present application is a continuation of U.S. patent application Ser. No. 09/529,760, filed Apr. 18, 2000, now U.S. Pat. No. 6,938,245, which is the national stage under 35 U.S.C. § 371 of PCT application number PCT/US98/22923, filed Oct. 28, 1998, which claims benefit of priority to the provisional application U.S. Ser. No. 60/063,992, Michael Spertus, Debugger with web browser interface, filed Oct. 29, 1997.

BACKGROUND OF THE INVENTION

1. Field of the Invention

The invention concerns interactive programming tools generally and more specifically concerns interactive program debuggers.

2. Description of the Prior Art

Debuggers are tools used by programmers to determine what is going on when a program is executed. A debugger typically permits a programmer to start and stop the program's execution and to examine the state of the memory (including hardware registers) being used by the program. Modern debuggers are interactive: that is, a programmer can input a command to the debugger and see the effects of the command within a relatively short period of time. Modern debuggers can further relate what the programmer does and sees to the source code for the program being debugged. Thus, if the programmer wants to examine the contents of a certain variable, he or she can select the variable by name and the debugger will show the programmer the contents in a form that corresponds to the type of the variable. Similarly, a trace of calls to subroutines made by the program and returns therefrom will display the names of the subroutines being called and returned to. Two examples of state-of-the-art debuggers are the BoundsChecker™, manufactured by Compuware Corporation, and Purify, manufactured by Rational Software. Further information about BoundsChecker may be found at www.numega.com/library/doc.shtml, which in October, 1998 contained the complete documentation for the debugger. Further information about Purify could be found in October, 1998 at www.rational.com/support/techpapers. In addition, the Purify debugger is the subject matter of U.S. Pat. No. 5,535,329, Reed Hastings, Method and apparatus for modifying relocatable object code files and monitoring programs, issued Jul. 9, 1996. A general discussion of debuggers may be found in Jonathan B. Rosenberg, How Debuggers Work, Algorithms, Data Structures, Architecture, Wiley 1996.

While any modern debugger is useful, debuggers would be more useful if they offered more flexible user interfaces. As it stands, debuggers have two ways of providing the user with information: by means of a proprietary interactive user interface which communicates directly with the debugger as it executes the program and by means of a log file, that is, a text file which contains a list of the interactions between the user and the debugger. Problems with this arrangement include first, that the interactive user interface can only be used to analyze the current execution of the program; information about past executions is contained in the log file, and that requires other tools to read it. A second problem is that the proprietary user interface requires that the user interacting with the debugger have the interface software and also limits the user to the kind of interaction dictated by the proprietary user interface. As for the log files, nothing can be done with the log file beyond what is usually done with text files.

One consequence of the use of proprietary user interfaces is that debuggers have not taken advantage of the standard graphical user interfaces that have lately evolved. In particular, they have not been adapted to work with Web browsers, and that in turn means not only that the programmer must use a less-convenient user interface than that provided by the his or her Web browser, but also that a programmer who wants to debug a program that is running on a remote machine cannot use the Web browser and the Internet to do the debugging, but must instead have a special connection to the remote machine which permits the programmer to use the proprietary interface.

What is needed, then, is a debugger which may be easily adapted to a number of different kinds of user interfaces, including the user interface provided by Web browsers and that works as well to analyze information about past executions of a program as it does to analyze information about a current execution. It is an object of the present invention to provide such a debugger.

SUMMARY OF THE INVENTION

The problems indicated above and others as well are solved by providing a debugging system in which a source of debugging information from an executing program performs update queries to a debug data base system containing debugging information the source receives as a result of the execution of the program and an interactive interface responds to user inputs by performing a read query on the debug data base which reads the debug information placed there by the source and then formatting the results of the read query as required by the user.

The information in the data base is persistent, and consequently, the interactive interface can be used not only with debug information from a current execution of the program but also with debug information from past executions of the program. Moreover, the debug data base effectively isolates the debugging information source and the interactive interface from each other; consequently, changes in either which do not affect what is written to or read from the data base do not affect the other. Further, a variety of different interactive interfaces may read from the debug data base and a variety of different debug information sources may write to the debug data base.

Among interactive interfaces that may be used with the debug data base is one that is adapted to be used with a standard World Wide Web browser. Such a Web server interactive interface has a URI (universal resource indicator) and responds to a message containing its URI by formatting and sending a HTML page to the browser. In many cases, the response also involves performing a read query on the debug database and returning an HTML page that contains the results of the query. Since the Web server interactive interface works with any Web browser, regardless of the browser's location in the Internet, debugging may be done equally easily either on the system where the Web server interactive interface is located or on a remote system.

One species of debugging systems of the type described above employs a source of debugging information which provides memory debugging information such as memory allocations, memory leaks, and current heap size.

Other objects and advantages will be apparent to those skilled in the arts to which the invention pertains upon perusal of the following Detailed Description and drawing, wherein:

BRIEF DESCRIPTION OF THE DRAWING

FIG. 8 shows the display used to update debugger settings in a preferred embodiment;

Figure 1:
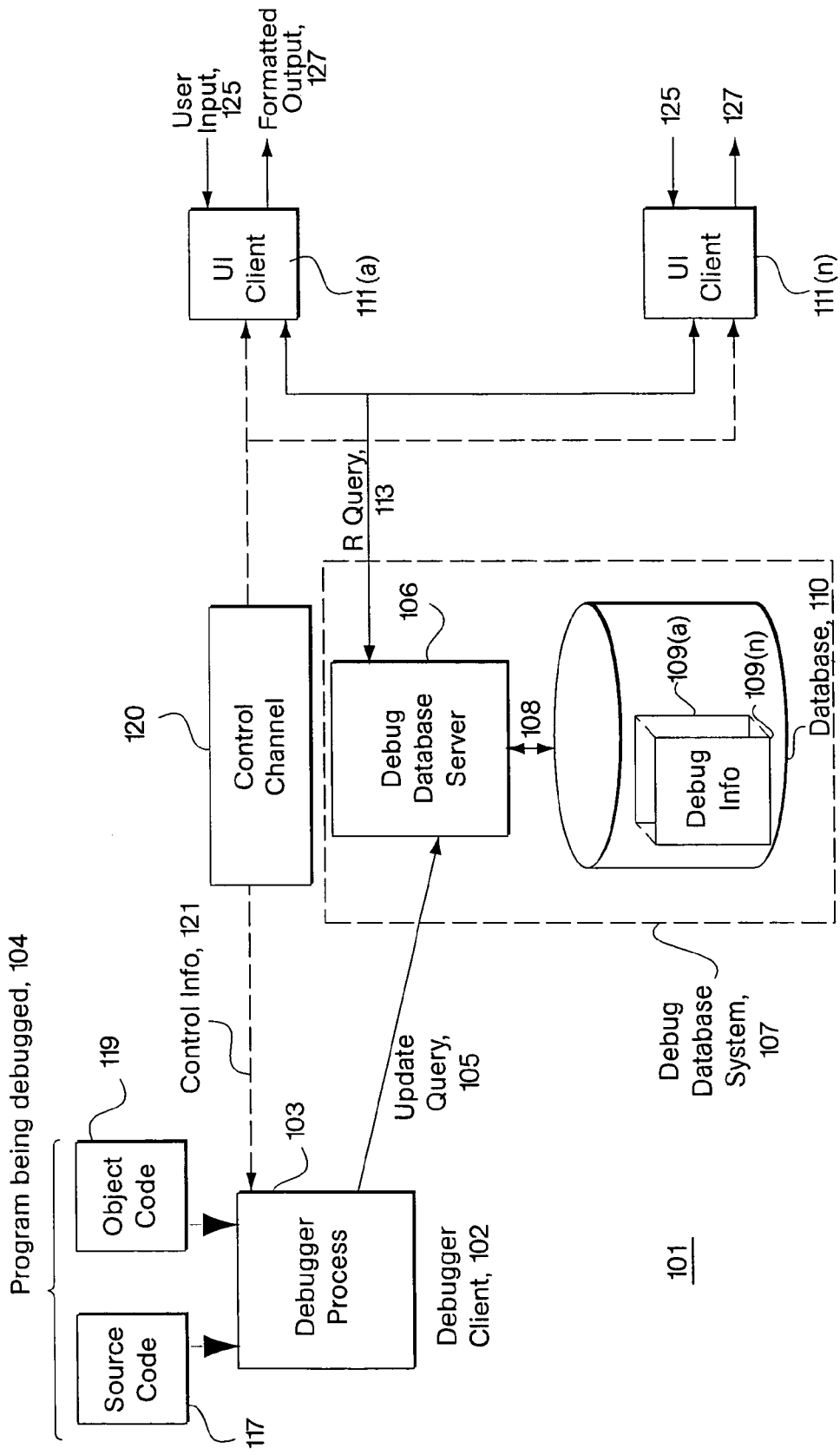
FIG. 1 is an overview of a debugging system which employs the invention.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present an overview of a debugging system that includes the invention, will then show how the invention may be used to provide multiple user interfaces, including a Web browser user interface, for an existing debugging system, and will then present details of the debug database and the Web browser interface in a preferred embodiment. The source of the debugging information in a preferred embodiment is an automatic memory management system, and the Detailed Description also includes details of the automatic memory management system.

Overview of a Debugging System Constructed According to the Invention:

FIG. 1

FIG. 1 is a conceptual block diagram of a debugging system 101 that is constructed according to the invention. The major components of debugging system 101 are debugging data base system 107, debugger client 102, and one or more user interface (UI) clients 111. Debugging data base system 107 contains a database 110 with persistent debugging information 109(*a..n*) for a variety of executions of programs. The term persistent is used herein to mean that the debugging information remains available in the database after execution of the program has ceased. Database 110 is managed by debug database server 106, which responds to queries from the other components of debugging system 101 by writing to or reading from debug info 109 as required by the query (arrow 108). Conceptually, debug data base server 106 has two sets of clients: debugger client 102, which provides update queries 105 containing debug information 109 to database 110, and one or more user interface clients 111, which provide queries that read selected debug information 109 from data base 110. Debug data base system 107 may be specially implemented for system 101, or it may be one of the many commercial data base systems.

One of the functions of debug database server 106 is to coordinate reads and writes of database 110. In some debugger systems 101, it will be enough simply to ensure that a read query never attempts to read data which is not yet available in database 110; in others, it may be necessary to ensure that what is read is the last complete write done by debugger client 102. One method of coordinating reads and writes is to treat each read and write as a transaction and to use standard database transaction processing techniques; where consistency requirements are less stringent, the overhead of transaction processing can be avoided and sufficient coordination of reads and writes may be achieved by ordering the writes such that information which a given record in the data base depends on is written to the database before the record itself is written, thereby ensuring that all the information needed to respond to a query for which the given record is a result is in the database by the time the record itself can be queried.

Debugger client 102 is a debugger which is executing a program being debugged 104 in debugger process 103. For purposes of the present discussion, a debugger client 102 may be any entity which executes a computer program in such a fashion that information about the execution which would not normally be available to a user of the program becomes available. Thus, debugger client 102 may be implemented expressly for system 101 or it may be any kind of existing interactive debugger. Debugger client 102 may have access to both the source code 117 and object code 119 for program 104. Debugger client 102 may interpret source code 117, but more generally, it will execute object code 119 and use source code 117 to make debug info 109 more understandable to the user of the debugger. Debug info 109 obtained from source code 117 and by means of execution of object code 119 is written to debug database 110 by means of update queries to debug database server 106. In some embodiments there may be more than one debugger client 102; for example, a programmer may want to watch the behavior of two closely-cooperating programs, or there may be debugger clients specialized for different programming languages or for different programming problems.

Each user interface client 111 receives inputs 125 from a user, responds to some inputs by making a read query (Rquery) 113 for debug data base server 106, and responds to the results of Rquery 113 by formatting the results and providing the formatted results to the user as formatted output 127. The forms of the inputs received and the outputs provided by a given interface client 111 depends on the kind of interactive interface employed by the user. Again, the interactive interface may be any presently existing or future interactive interface.

Debugger client 101 and the user interface clients 111 further communicate with each other by means of control channel 121, which may be any arrangement which permits transfer of messages between debugger client 102 and a user interface client 111. User interface client 111 uses control channel 121 to transfer debugger commands to debugger client 101, while debugger client 102 uses control channel 121 to transfer debugger event messages to user interface client 111. For example, a first debugger command may instruct the debugger concerning the kinds of information it is to output, while another may instruct the debugger to stop execution of program 104 at a predetermined point. A debugger event may inform interface client 111 that the predetermined point has been reached and that the debugger has stopped execution of the program. Possible implementations of control channel 121 include among others inter-process communications, events and callbacks, shared memory, and a shared database.

Operation of debugger system 101 is as follows: as debugger client 102 is executing program 104, it outputs debugger information 109 to debug database server 106 by means of update queries 105. While doing this debugger client 102 also responds to commands received on control channel 120 and where required, sends event messages via control channel 120 to user interface client 111. Debug data base server 106 updates debug info 109 for the execution of program 104 being performed by debugger client 102 in response to the update queries 105. While this is going on, user interface client 111 is responding to event messages from debugger client 102 and responding to user inputs 125. In both cases, the response may involve a command to debugger client 102 and/or a read query 113 to debug database server 106. Debug database server 106 responds to read query 113 by sending a result to user interface client 111, which then formats the result as required by the interactive user interface being used by the user and sends the formatted result to the user. The user may respond to the formatted result with another input 125, beginning the process again. Coordination between database server 106 and client 111 may be done in many ways. In some cases, client 111 may initiate all actions; in others, client 111 may respond to changes in database 110. In those cases, client 111 may simply repeatedly poll database 110 until a change occurs or data base system 107 may include a mechanism for sending an event message to user interface client 111 indicating that a change has taken place.

It is a particular advantage of debugging system 101 that debug database system 107 isolates debugger client 102 and UI clients 111 from each other. The builders of debugger client 102 need know nothing about the forms taken by user input 125 and formatted output 127 in a given user interface client 111(*i*); all they need to know is the query interface to debug data base system 107. Similarly, the builders of user interface client 111(*i*) need know nothing about the form taken by debugger information in debugger client 102; they, too, need to know only the query interface to debug data base system 107. Moreover, because debugger client 102 and user interface clients 111 are isolated from each other, modifying a user interface client 111(*i*) or adding a new user interface client 111(*x*) to debugging system 101 requires no changes whatever to debugger client 102. Similarly, modifications of debugger client 102 or additions of new debugger clients requires changes to the user interface clients 111 only to the extent that the changes in debugger client 102 involve the addition of new kinds of information to database system 107. If control channel 120 is implemented in debug data base system 107, there is no direct communication between debugger client 102 and a UI client 111(*i*) and the isolation is complete.

Figure 2:
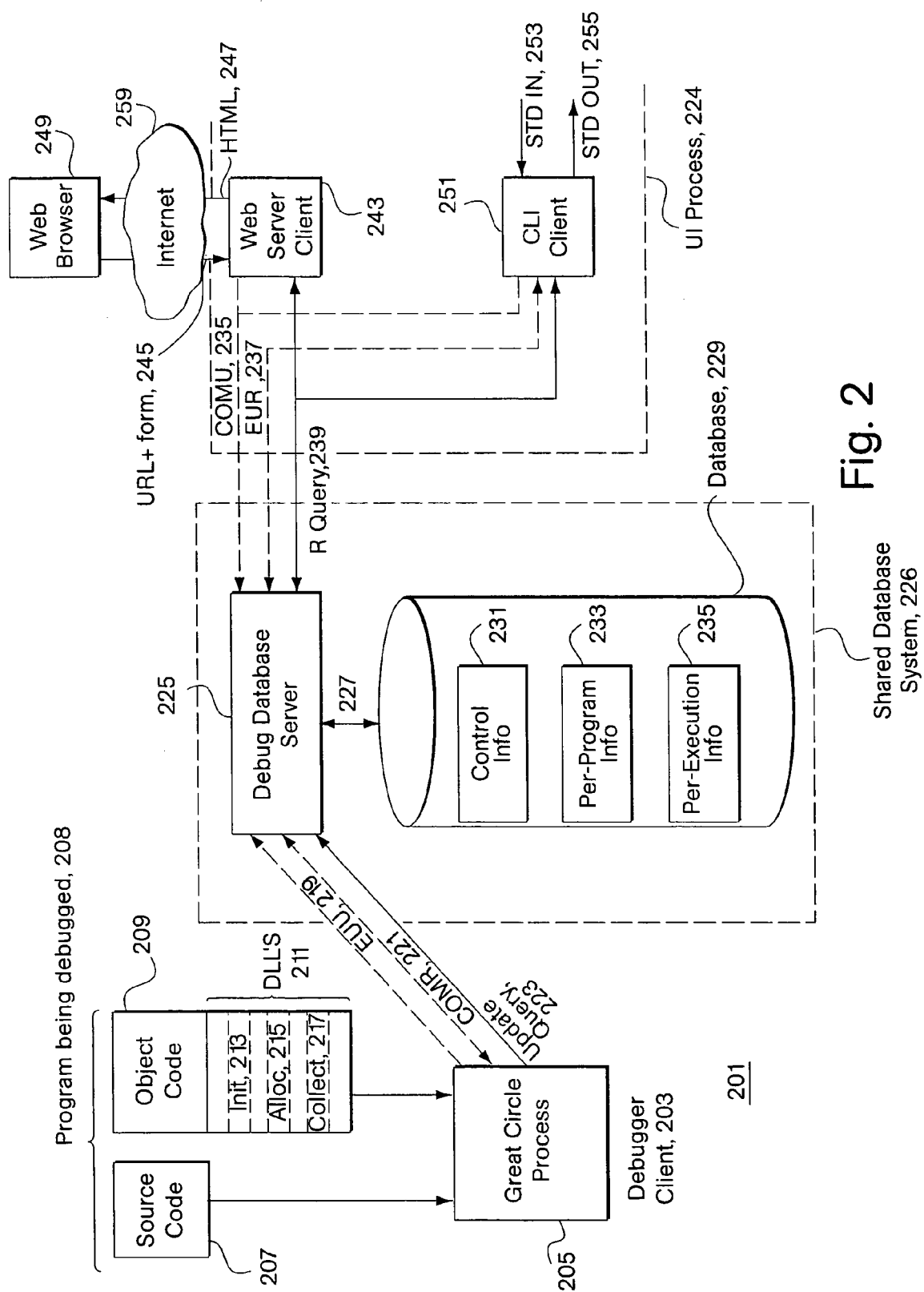
FIG. 2 is a block diagram of a presently-preferred embodiment of the invention.

A Memory Debugging System Incorporating the Invention: FIG. 2

In a preferred embodiment of the invention, the techniques described above are used to provide a Web browser user interface and a CLI user interface for a memory debugger. A memory debugger is a debugger which is used to analyze how the program explicitly allocates and frees memory. Memory explicitly allocated by a program resides on the program's heap. One problem detected by a memory debugger is memory "leaks", which occur when a program contains code that allocates memory, but does not contain code that frees the allocated memory when it is no longer being used by the program. Leaks of course always waste memory; with serious leaks, all of the heap memory available to the program may be occupied by leaks, and in that case, the program will fail when a new allocation is attempted. Another problem detected by a memory debugger is data structures that continue to grow until they occupy all of the available heap memory.

The memory debugger in the preferred embodiment is the Great Circle™ automatic memory management system, manufactured by Geodesic Systems, Inc. The main function of the Great Circle system is to provide automatic memory management for programs written in languages such as C or C++, which have no provision for automatic memory management. Great Circle does automatic memory management by periodically collecting garbage, that is, memory which was once allocated but is no longer being used by the program, and freeing the garbage memory for reuse. From the point of view of memory debugging, of course, garbage is the result of leaks. Thus, the information required to do garbage collection can also be used for memory debugging, and consequently, the Great Circle system has a debugging mode as well as a memory management mode. The Great Circle system prior to its modification as required for it to be a component of a debugging system of the type shown in FIG. 1 is described in detail in the manual, *Great Circle Automatic Memory Management System for C and C++*, version 1.0, Geodesic Systems, Inc., 1995, which is hereby incorporated by reference into this Detailed Description.

FIG. 2 shows a presently-preferred embodiment of the invention in which debugger client 203 is implemented by means of Great Circle process 205 which is executing a program 208 whose object code 200 has been linked at the beginning of execution to a set of dynamically-linked libraries (DLLs) 211 which include code that performs Great Circle's memory management and debugging functions. Of particular interest in the present discussion is the code in the DLLs for program initialization 213, for memory allocation 215, and for garbage collection 217. When the Great Circle system is operating in debugging mode, code 213, 215, and 217 responds to debugger commands and makes update queries containing debugger information to shared database system 226.

Shared data base system 226 implements the debug data base system and control channel 120 in the preferred embodiment. As before, the components of shared data base system 226 are a debug data base server 225 and a data base 229. In the preferred embodiment, shared data base system 226 is implemented in memory that is shared between Great Circle process 205 and a user interface process 224 that implements UI clients 111. Debug data base server 225 is a set of database management routines in the shared memory that may be directly executed by either Great Circle process 205 or user interface process 224. Database 229 in the preferred embodiment consists of files which have been memory mapped into the shared memory.

The preferred embodiment has two user interface clients: one, web server client 243 responds to inputs from and produces outputs to a Web browser 249 which communicates with web server client 243 by means of Internet 259. Use of Internet 259 means that Web browser 249 may be operating on the computer system upon which Web server client 243 is executing or on any other computer system that has access via Internet 259 to the computer system upon which server client 243 is executing. The other user interface client is CLI client 251, which offers a standard CLI interface to system 201. Inputs 253 are received from the device stdin, usually the keyboard, and outputs 255 go to the device stdout, usually the display. In the preferred embodiment, both Web server client 243 and CLI client 251 are implemented by means of code that is executed in user interface process 224, and thus both have access to shared database system 226.

Data base 229 contains three broad classes of information:
control information 231;
per-program information 233; and
per-execution information 235.

Control information 231 is the portion of the database that implements control channel 120. As shown by dashed lines COMU 235 and COMR 221, either Web server client 243 or CLI client 251 provide commands to debugger client 203 by performing update queries to control information 231; debugger client 203 receives the commands by performing read queries on control information. In the preferred embodiment, debugger client 203 executes code in ALLOC 215 that performs a COMR query 221 on control information 231 prior to allocating new storage for the execution of program 208 Similarly, when an event occurs which is of interest to a user interface client, debugger client 203 does an update query EVU 219 to control information 231. In the preferred embodiment, the user interface client repeatedly does event read queries 237 on control info 231 to determine whether the event has occurred.

Per-program information 231 is information which is peculiar to a given program that has been executed by the debugger but which is the same for all executions of the program. Debugger client 203 performs update queries 223 that write per-program information 231 for a given program when it initializes itself for the first execution of the program. The update queries are done by code in INIT 213. Per-execution information 235 is information that is accumulated on each execution of a program by debugger client 203. The update queries that provide per-execution information 235 to data base 229 are done by code in ALLOC 215 that is executed whenever memory is allocated during execution of a program and code in COLLECT 217 that is executed whenever a garbage collection is done during execution of a program. Per-program info 233 and per-execution info 235 are read by read queries (RQUERY) 239 made by the user interface client that needs the information.

Figure 3:
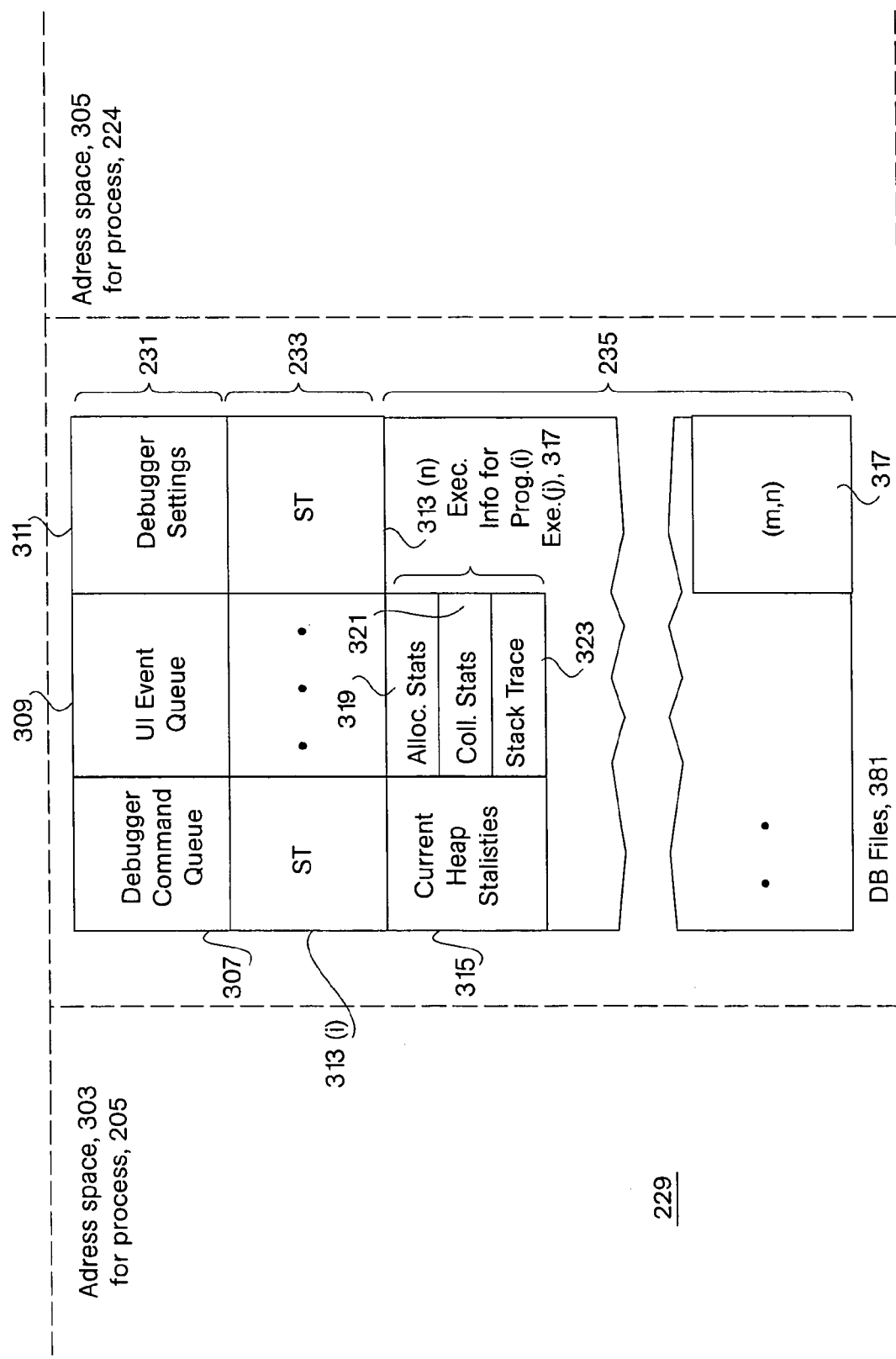
FIG. 3 provides an overview of the debugger database of the preferred embodiment.
Figure 4:
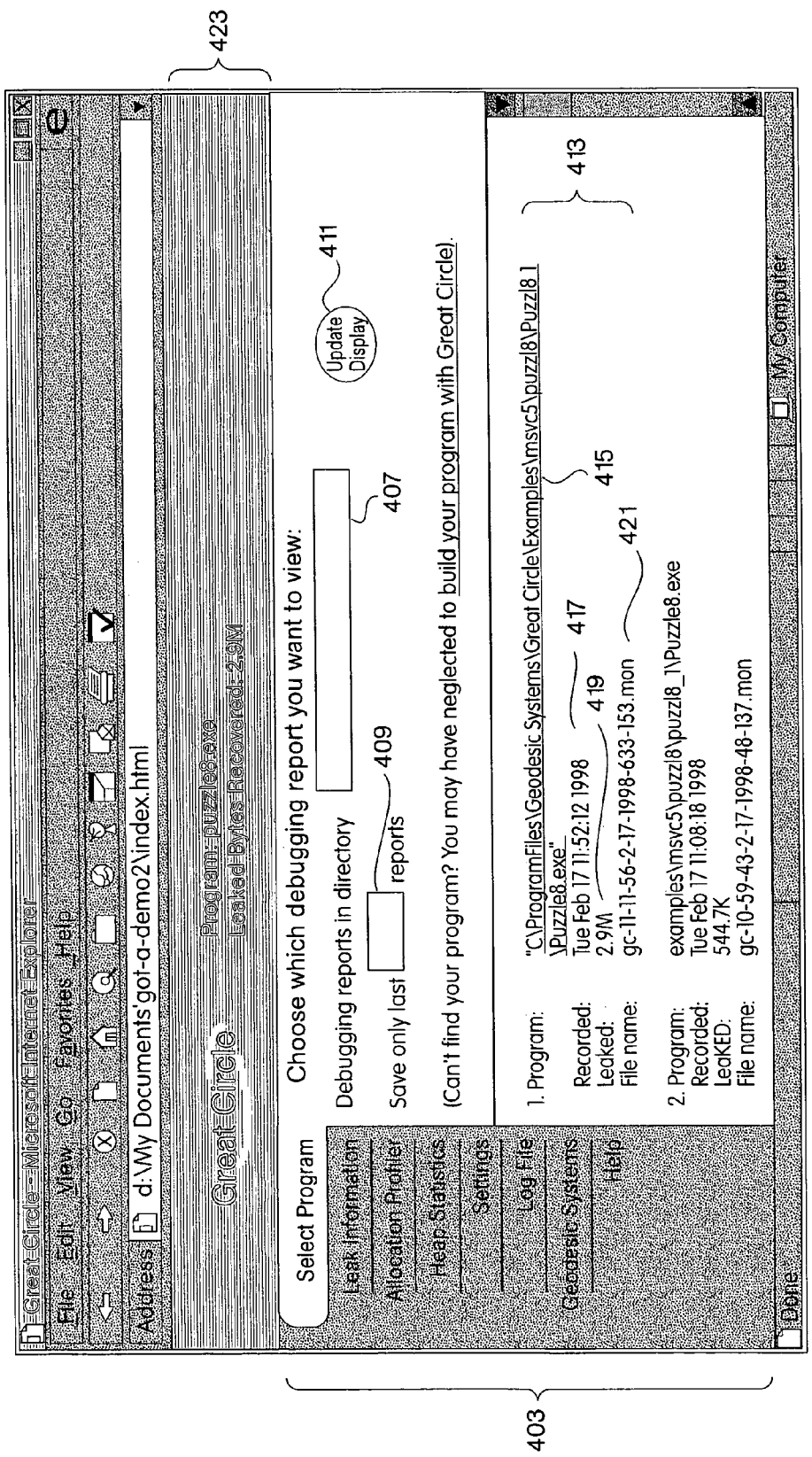
FIG. 4 shows a display generated from the HTML page by means of which the user selects a debugging report.

Details of Database 229: FIG. 3

FIG. 3 shows details of the contents of database 229 in the preferred embodiment of FIG. 2. As already mentioned, database 229 is implemented as a set of database files 301 which has been mapped into address space 303 for Great Circle process 205 and address space 305 for process 224 which executes the user interface clients in the preferred embodiment. There are three kinds of information in control information 231: a queue of commands 307 for debugger client 203, a queue of events 309 for the user interface process, and debugger settings 311, which are current control and status settings for debugger client 203. The control settings are set by the user interface clients and read by debugger client 203 and the status settings are set by debugger client 203 and read by the user interface clients.

In the preferred embodiment, debugger client 203 responds to the following commands:
collect: perform garbage collection for the program 208 being currently executed by debugger client 203;
stop: stop execution of the program 208 being currently executed by debugger client 203;
restart: restart execution of the program 208 being currently executed by debugger client 203.

Of these, the first is used by both web server client 243 and CLI client 251, but the second and third are used only by CLI client 251. In the preferred embodiment, only CLI client 251 responds to a debugger event. The event is the detection of a memory leak. When the event occurs, CLI client 251 responds by querying database system 226 and to obtain the information about the leak that was written there by debugger client 203. The control and status settings 311 will be explained in more detail in the following description of the user interface for web browser 249.

Per-program information 233 in the preferred embodiment is a symbol table for each program that debugger client 203 has executed. Debugger client 203 makes the symbol table and writes it to database 229 as part of the initialization it performs when it executes a program for which there is no symbol table in database 220. The symbol table contains the information which is required to relate information about the execution of a program 208 to names and locations in source code 207 for the program.

Per-execution information 235 in the preferred embodiment includes information concerning the execution of program 208 which debugger client 203 is currently performing and information from executions of programs which debugger client 203 has performed in the past. The information for the current execution includes current heap statistics 315, which shows the space currently occupied by storage in the program's heap, and execution information 317 for the current execution. Execution information 317 includes allocation statistics 319, indicating how much memory has been allocated, garbage collection statistics 321, indicating the memory leaks, and stack trace 323, showing the calls and returns made by the program during the program execution. For the current execution, execution information 317 shows the state of the program as of the most recent memory allocations and garbage collections. For past executions, execution information $317(i,j)$ for execution j of program i shows the state of executions) as of the conclusion of execution. Thus, allocation statistics 319 will show all memory allocated, collection statistics 321 will show all leaked memory, and stack trace 323 will show the stack trace for the entire execution(j).

Operation of Debugging System 201

When debugger client 203 is not executing a program 208, a user interface client can still access execution information $317(i,j)$ for any program(i) and execution (j) for which the information is present in data base 229. To access the information, the user interface client first queries database system 226 to obtain a list of the programs and executions, which it displays to the user, and then responds to a user selection of a program and execution by displaying execution information $317(i,j)$ together with information from the relevant symbol table 313. What information is displayed is determined from further user inputs.

To analyze an execution of a program that is presently taking place with debugging system 201, the user first begins an execution of the program in which the Great Circle DLLs 211 have been linked to the program. The programs in the DLLs 211 cause debugger client 203 to check control information 231 for commands and settings each time it allocates memory, to write the current program pointer to stack trace 323, and to write statistics concerning the allocation to allocation statistics 319. Each time debugger client 203 does garbage collection, it writes collection statistics to collection statistics 321. For each detected leak, the statistics for the leak show the size of the leak and the point in the stack trace at which the leak occurred. If the user of an interface client selects the current execution(m) of program(l), the resulting query to database system 226 selects and returns the information currently in execution info $317(l,m)$. In a preferred embodiment, the query to execution info $317(l,m)$ is repeated each time the user of an interface client desires a different view of the information in execution info $317(l,m)$. Further-more, the user can explicitly request the interface client to perform a new query to obtain the current state of execution info 317(*l,m*). In other embodiments, the debug database may provide an event message to the interface client when execution info 317(*l,m*) changes and the interface client may respond thereto by making a new query.

As indicated above, debugger client 203 further responds to collect, stop, and restart commands from the interface client. Ordinarily, debugger client 203 does garbage collection at predetermined intervals; execution info 317(*l,m*) reflects the most recent garbage collection. When the user interface client issues a collect command, debugger client 203 responds by making the collection the next time it does a memory allocation operation and outputting the new collection statistics to collection statistics 321. In a preferred embodiment, the user waits until he or she believes that a memory allocation operation has taken place and makes a new query to obtain the current state of execution info (l,m). The results of the new query reflect the garbage collection. In other embodiments, garbage collection may be done by a background thread that runs in response to the command and the update query containing the collection statistics may cause an event to be generated to the user interface client, which would then respond by making a new query. The stop command simply stops execution of program 208(*l*); the restart command restarts the execution of program 208(*l*).

Coordination between UI process 224's updates to and reads from database system 226 and Great Circle process 205's updates to and reads from database system 226 need not satisfy the strict requirements of transaction processing, since even results that are not quite current are useful and the user may easily update the results he or she has. That being the case debugging system 201 avoids the overhead of transaction processing by ordering the writes in such a fashion that all of the information required for a read query is available by the time the read query can be made. For example, the information about a memory leak that is output to the user includes the stack trace for the leak; in performing update queries on data base system 226, debugger client 102 performs the update query that writes the stack trace before it performs the update query that writes the leak information; consequently, if a read query can return leak information for a leak, it can also always return the stack trace for the leak. In other embodiments, of course, other coordination techniques, including transaction processing, may be used.

Details of Web Server Client 243: FIGS. 4-8

Web server client 243 receives inputs from and provides outputs to any standard Web browser 249. The inputs and outputs are transferred via Internet 259. From the point of view of Web browser 249, Web server client 243 is a standard Web server, that is, it receives a universal resource locator (URL) which specifies the server and in many cases attached data and responds to the URL by providing a page in HTML format to web browser 249. The attached data is used at the location specified by the URL. If the specified location has access to a data base, the specified location may use the attached data to form a query to the data base and return the result of the query in the HTML page. Details about all of this may be found for example in *A Beginner's Guide to HTML*, published by NCSA and available at pubs@ncsa.uiuc.edu and in the section "Common Gateway Interface(CGI)" of *HTML for Dummies*, available in October, 1998 at www.lanw.com/html4dum/h4d3e/extras/ch18sec1.htm.

The URL specifies a Web server by means of a port number in the system on which the Web server is running and an Internet Protocol (IP) address for the system in the Internet. The URL for web server client 243 specifies port number 50565. The IP address for the system in the URL depends on whether Web browser 249 is running on the same system as Web server client 243. If it is, the IP address is the IP loopback address, normally 127.0.0.1, so that messages from Web browser 249 to client 243 go directly to client 243, without passing outside the system to which browser 249 and client 243 belong. If IP browser 249 is not running on the same system, the IP address of Web server client 243 is the IP address of the system on which it is running and the messages pass between browser 249 and client 243 via Internet 259 external to the systems upon which browser 249 and client 243 are located.

Detailed Interaction Between Browser 249 and Server 243: FIGS. 4-8

The interaction between Web browser 249 and Web server client 243 in a preferred embodiment is as follows: The user begins the interaction by specifying the URL of Web server client 243 to Web browser 249 then sends the URL. When server 243 receives the URL, it sends an HTML page which, when displayed by browser 249, has the appearance shown in FIG. 4. Page 401 is the select program page, so called because it permits the user of browser 249 to select which execution of a program he wants to view a debugging report for. The execution is selected by clicking on the program's pathname in execution listing 413. Execution listing 413 also shows the time the debugging information for the program was recorded at 417, the amount of leaked memory at 419, and a file 421 which contains the debugging report for the execution. This file is one of the ones that is mapped into memory to provide debug data base 229.

Once a program has been selected, its name and the number of leaked bytes recovered are indicated at 423 in page 401. Box 407 indicates the directory in which debugging reports may currently be found. The user can change the directory, and future debugging reports will be saved in the indicated directory. Box 409 indicates how many reports for the program will be saved; the user can of course change that value as well. If the selected program is currently being executed by debugger client 203, the user can click on update display button 411. In response thereto, web browser 249 sends a form together with Web server client 243's URL. The form indicates the program's pathname and the current settings in fields 407 and 409, and Web server client 243 responds to the form by performing a query on the information for the current execution of the program in shared database system 226 and making a new select page 401 in which execution listing 413 is updated to reflect the most recent updates of database 229 by debugger client 203. Further, the directory for the debugging reports and the number of reports saved will be changed as indicated in boxes 407 and 409.

Once the user has selected a program execution, the user may select other HTML pages to obtain more detailed information about that execution. An HTML page is selected by selecting one of the tabs 403. Each time the user selects a tab, web browser 249 responds by sending the URL of client 243 together with a form which contains an indication of the tab that has been selected, the pathname of the program, and an indication of which execution listing was selected. Web server client 243 responds to the information in the form by performing a query on data base 229 which obtains the information for the selected program that is required to make the selected HTML page and returning the page with the information to browser 249. If the selected execution is a current execution, the selection of a new HTML page will cause a new query of database 229 for information about the current execution, and consequently, selection of a new HTML page has the same effect as clicking on Update Display button 411.

Figure 5:
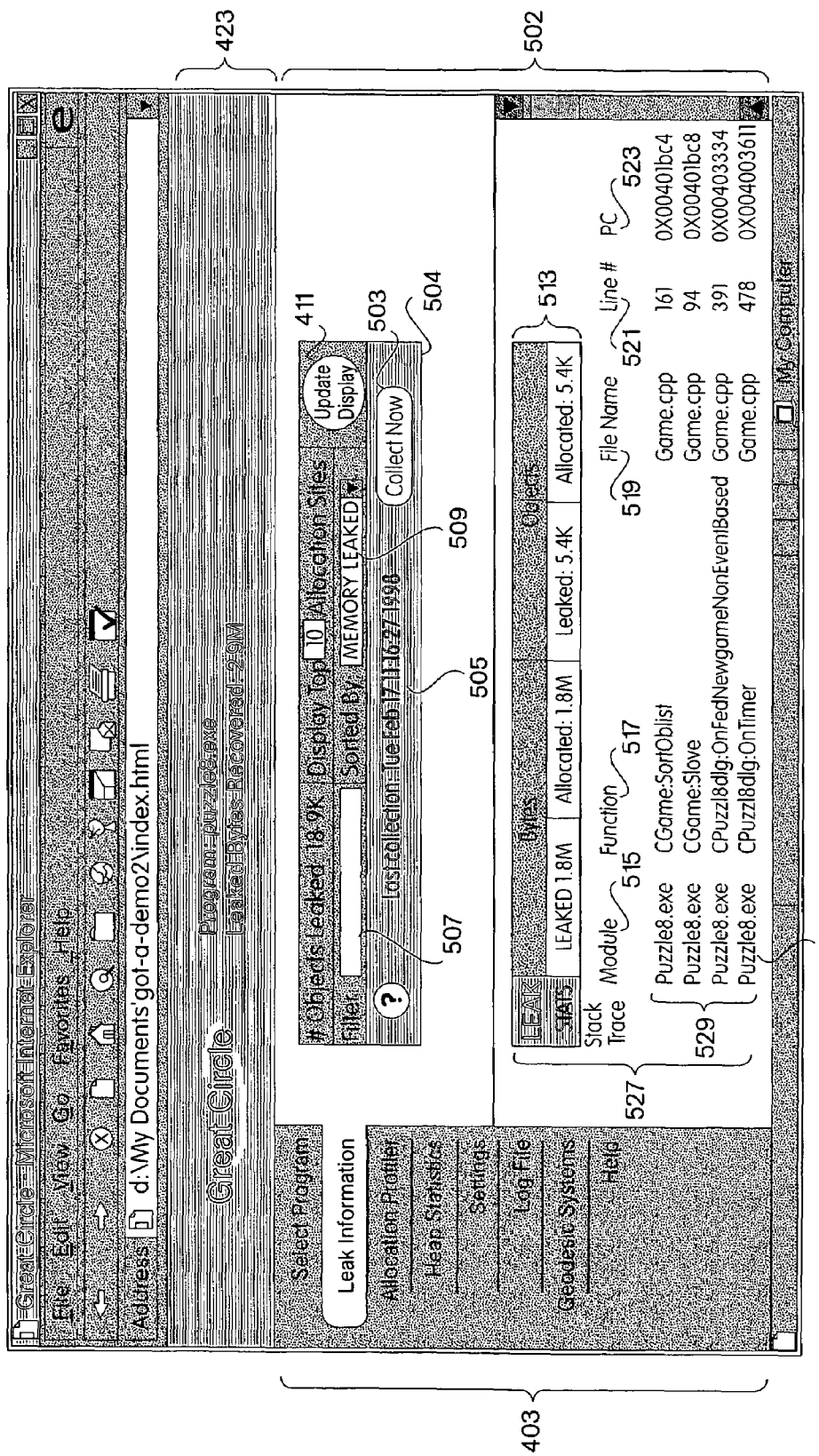
FIG. 5 shows a display generated from the HTML page by means of which the user views leak information.

FIG. 5 shows leak information page 501. This page shows detailed leak information for the program execution selected by the user from select page 401. The page has the same general format as page 401; information specific to the page is contained in area 502. Area 502 has two main parts: control panel 504 and leak information display 525. The settings of control panel 504 determine what information appears in leak information display 525. Control panel 504 contains update display button 411 and a collect now button 503. When the user clicks on collect now button 503, the form transmitted with the URL to web server client 243 indicates that client 243 is to send a collect command to debugger client 203, so that debugger client 203 will perform a garbage collection in the near future. The control panel further contains field 507, which permits the user to filter the leak information, field 509, which specifies a sort mode and an indication of how much of the information is to be displayed. When the user clicks on update display button 411, this information is included in the form which is sent to Web server client 243 and Web server client 243 uses the information to formulate its query on database 229 and construct the new leak information page 501.

Leak information display 525 contains a leak listing 527 for each leak. The listings 527 are ordered by leak size. Each listing 527 contains leak statistics 513 and a leak stack trace 529. Leak statistics 513 specify the amount allocated and the amount leaked in terms of both bytes and objects. Leak stack trace 529 indicates the execution path that resulted in the leak. The execution path has columns for program counters (523), line numbers (521), file names (519), function names (517), and module names (515). It thus relates the leak to program counter positions in modules and relates the program counter positions to the functions the program counters are in, the files that contain the source code for the functions, and the line number in the source code corresponding to the program counter position. The information for columns 515, 519, and 521 is of course obtained from symbol table 313 for the program.

Figure 6:
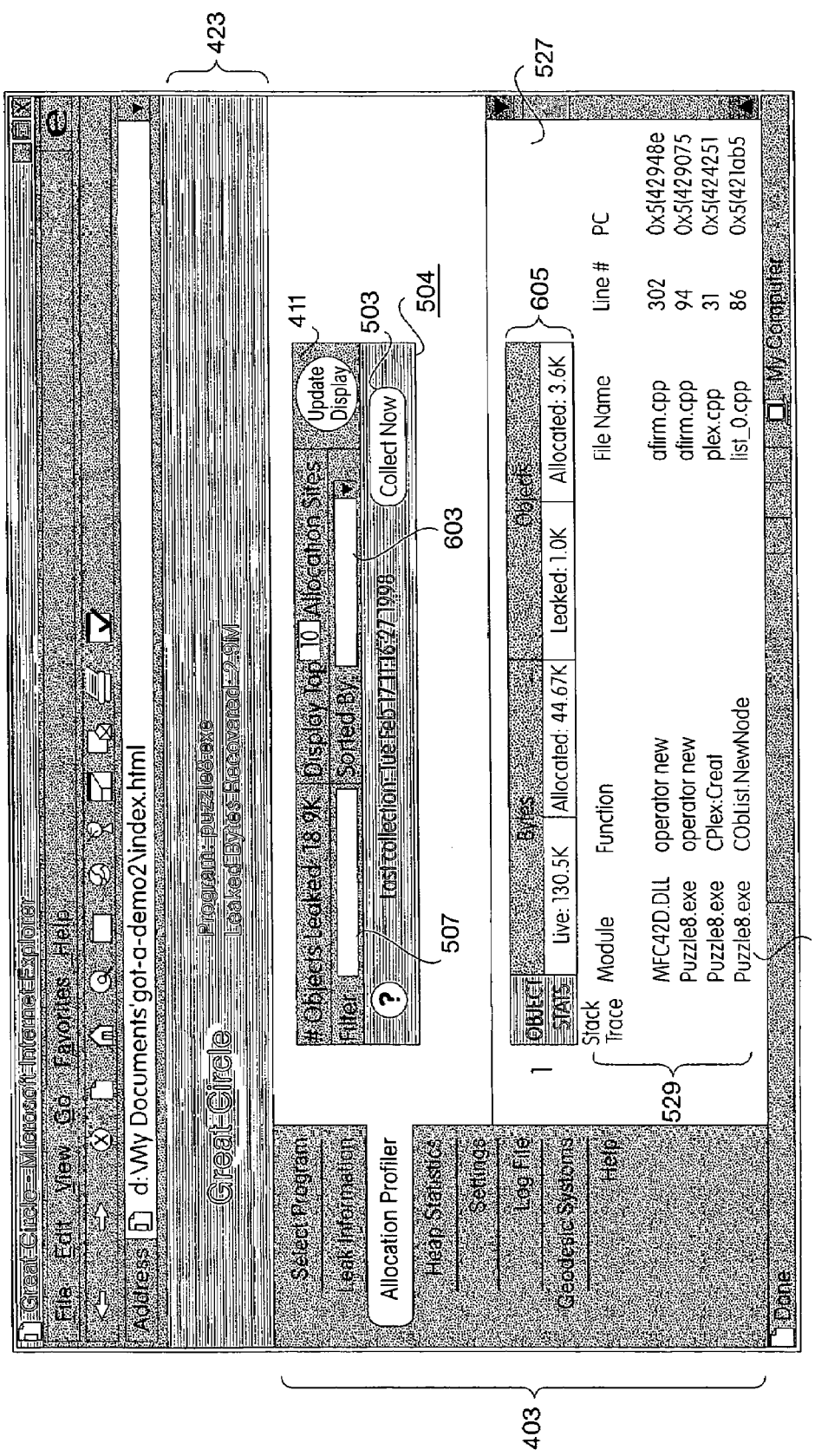
FIG. 6 shows a display generated from the HTML page by means of which the user views heap allocation.

FIG. 6 shows allocation profiler page 601. This HTML page shows allocations of memory on the heap during execution of the program. The page has in general the same form as page 501, with the changes that correspond to its function. Thus, the sort 603 is now by live memory, area 605 displays live and allocated memory in terms of bytes and objects, and stack trace 529 gives the execution paths for the allocation events. The queries that produce the information on form 601 of course are directed to allocation information rather than leak information.

Figure 7:
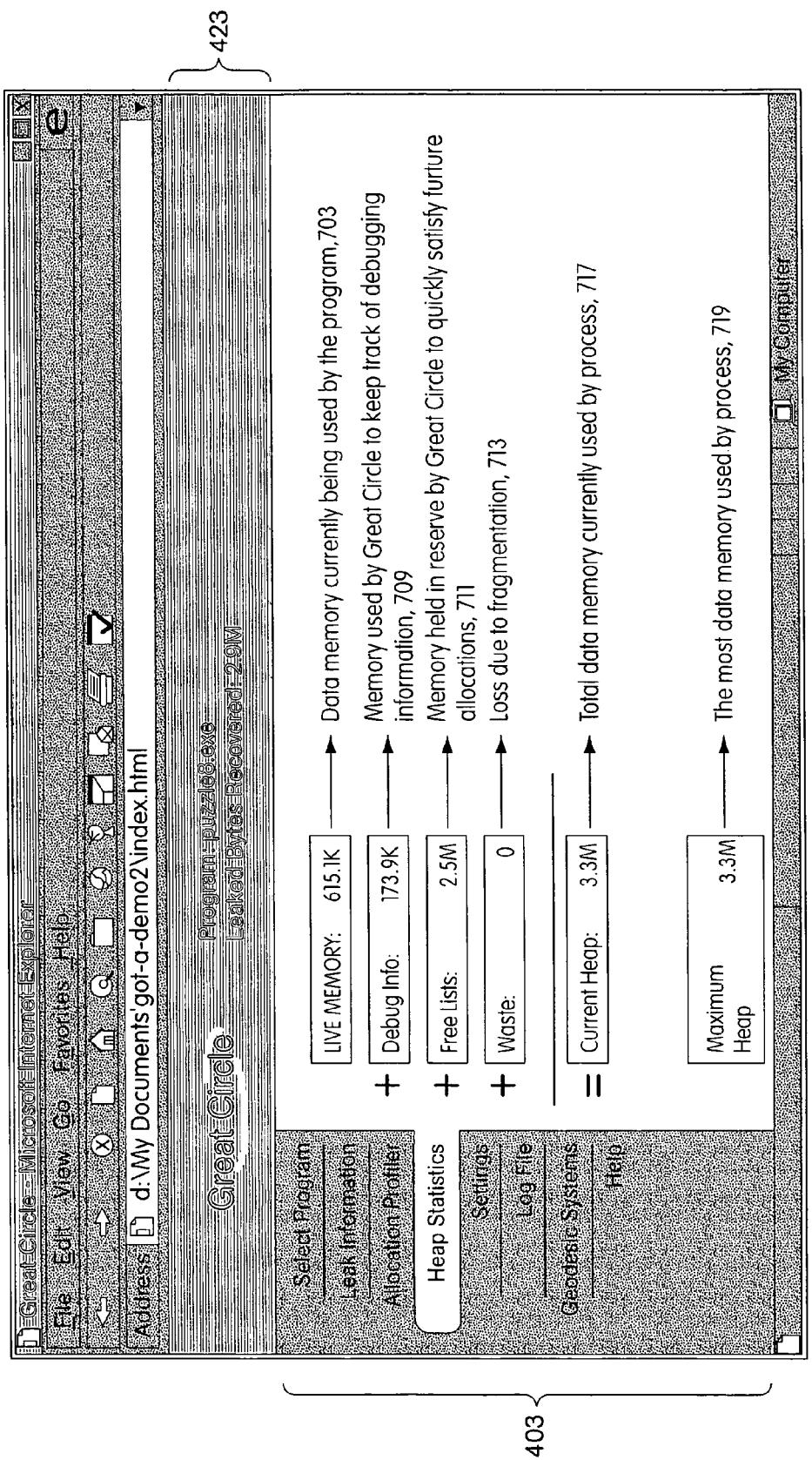
FIG. 7 shows a display generated from the HTML page by means of which the user views heap statistics.

FIG. 7 shows heap statistics page 701. This page contains valid information only when debugger client 203 is currently executing a program. Page 701 displays a running total of leaked memory recovered by Great Circle and of memory that has been unmapped by explicit user calls to free( ) or delete made by the program. It also breaks down the total current heap, which is memory actually still in use, into several categories:

Live memory, shown at 703, includes all data structures that are currently being used (or at least explicitly pointed to) by program 208.
Debug info, shown at 709, is the memory that Great Circle itself requires to keep track of stack traces and other information about the objects allocated by program 208.
Free lists, shown at 711, are structures that Great Circle, like any memory allocation function, stockpiles in order to perform future allocations rapidly and efficiently, without inducing excessive memory fragmentation.
Waste, shown at 713, unlike free lists, is memory that is temporarily unavailable for future allocations because of fragmentation.

The sum of these categories is the current heap size, shown at 717. The current heap size is the actual current footprint in memory of program 208 that debugger client 203 is currently executing. Since Great Circle attempts to reduce the footprint whenever it can, Heap Statistics page 701 also shows the maximum heap at 719. The maximum heap is the high-water mark of heap usage over the life of program 208.

Other HTML Pages Produced by Web Server Client 243

Other HTML pages which the user may select include a settings page, which permits the user to set and read a number of parameters that control the operation of debugger client 205, a log file page which permits the user to view an ASCII log file produced by debugger client 203, a page whose selection causes a URL to be sent to Geodesic Systems' Web site, and a page whose selection causes a page in the help system for the debugging system to be displayed. HTML pages 501 and 501 also include help buttons for help that is particularly relevant to those pages. In the following, the settings page and the log file page will be discussed in greater detail.

FIG. 8 shows the buttons 801 of the settings page. Each button shows the current setting of the parameter specified by the button, and in the case of the writeable parameters indicated at 805, 807, 809, 811, 813, 821, 823, 825, and 827, debugger client 203 responds to the new parameter value in real time when the user changes the parameter and then clicks on update settings button 803. Clicking on button 803 causes web browser 249 to send a form to Web server client 243 that contains the new parameter settings and Web server client 243 responds to the form by making an update query with the settings that updates the relevant parameters in debugger settings 311. As previously mentioned, debugger client 102 queries database 226 to obtain the current values of settings 311 as part of each allocate operation, and on reading the settings, it updates its parameter values and begins to operate according to the updated parameters. Changes made via the settings page affect only the program execution during which they are set. Default values for the settings may be supplied when debugger client 203 is configured. The log file page displays the log file, gc.log, that was generated by Great Circle for this program run. This file, unlike the files that make up database 229, is in a plain ASCII format that is well suited for piping through custom scripts provided by the user of debugger system 201.

As can be seen from FIGS. 4-8, the HTML pages produced by Web server client 243 in response to inputs from Web browser 249 provide a user interface to debugger client which is clear and easy to use and can be employed on any system which has a standard Web browser and a connection to Internet 259. The interface further permits the user to view the results of past executions of programs by debugger client 203 and to view the results of a current execution as it happens. While viewing results being produced by a current execution, the user may send a collect command and/or new parameter settings to debugger client 203, and debugger client 203 will respond in real time to the collect command and parameter settings.

Improved Memory Allocation and Footprint Management Techniques

As mentioned above, the memory debugger of the preferred embodiment is a mode of operation of the Great Circle memory management system. In the following, two improvements in memory allocation and program footprint management that are employed in the version of the Great Circle memory management system which is used in the preferred embodiment of the debugging system are described in detail.

Introduction

The two techniques described in the following are used the preferred embodiment to reduce fragmentation which results from the fact that the Great Circle memory management system uses a non-moving garbage collector, that is, a garbage collector that cannot eliminate fragmentation by moving live data, leaving all free space in consecutive locations. For details about non-moving and moving garbage collectors, see Jacques Cohen and Alexandru Nicolau, "Comparison of compacting algorithms for garbage collection", *ACM Transactions on Programming Languages and Systems*, 5(4): 532-553, October 1983. The first technique is intended to reduce internal fragmentation in allocators that use a BiBoP scheme (Big-Bag-of-Pages) In a BiBoP allocator, the allocator allocates objects that are smaller than a memory page from a free list in which the objects are takes from page-size containers. All of the objects allocated from a given free list have the same size. Thus, when the allocator is given the size of the object it is to allocate, it allocates from the free list into whose objects the object to be allocated fits most closely. For details, see Hans-Juergen Boehm and Mark Wieser, "Garbage collection in an uncooperative environment", *Software Practice and Experience*, 18(9): 807-820, September 1988. The second technique is intended to reduce external fragmentation and uses virtual memory primitives that can be found in most modern operating systems.

Allocators such as the one described in the Boehm paper cited above have a number of free lists for allocating objects of a size such that more than one will fit onto a memory page and a single free list for allocating objects that are larger than that. Objects of a size such that more than one will fit onto a memory page are termed small objects, and those that are larger than that are termed large objects. With all of the small object free lists, the container size is 1 page. In this paper, we show that when the allocator is able to allocate only from small object free lists and a large object free list, allocation of small objects with sizes such that a number of them do not fit compactly into a single-page container or of large objects with sizes that do not fit compactly into an integer number of pages results in a large internal fragmentation in the free lists. To solve this problem, the first technique introduces free lists for allocating objects that do not fit compactly into a single-page container but that do fit compactly into a container made of a number of consecutive pages. The objects on these free lists are termed herein medium objects. As with small objects, there are a number of free lists for medium objects, with the medium objects on a given free list all having the same size, and the allocator takes a medium object from the free list into whose objects the object being allocated fits most closely.

Most modern operating systems have separate virtual memory operations for reserving virtual address space and committing swap space to the reserved virtual address space. Because this is the case, swap space may be committed and uncommitted at runtime. The basic idea of the second technique is to uncommit swap space belonging to logical pages in those sections of the large object free list that are too fragmented to be used for most large object allocations, and to commit that swap space to logical pages located at consecutive locations in the address space. In effect, this technique provides many of the defragmentation benefits of moving garbage collection by virtually moving the free data rather than the live data. In addition, this technique allows returning to the operating systems parts of the heap that were used during periods of heavy allocation and that are no longer used. We will refer to this aspect of the technique as footprint reduction.

The ideas presented here are explained in the context of garbage collection. Incremental garbage collectors which use these ideas must have a decommit barrier which ensures that the garbage collector does not reference a logical page that has been decommitted. A garbage collector with a decommit barrier is described in detail in U.S. patent application Ser. No. 08/891,687, M. Spertus, et al., Incremental garbage collector with decommit barrier, filed Jul. 11, 1997, which is hereby incorporated by reference into the present patent application. The ideas can, however, also be applied to any general-purpose memory allocator, regardless of whether it uses garbage collection. In the following, a preferred embodiment of these techniques which is employed in the Great Circle memory management system is explained in detail, beginning with medium objects.

Figure 9:
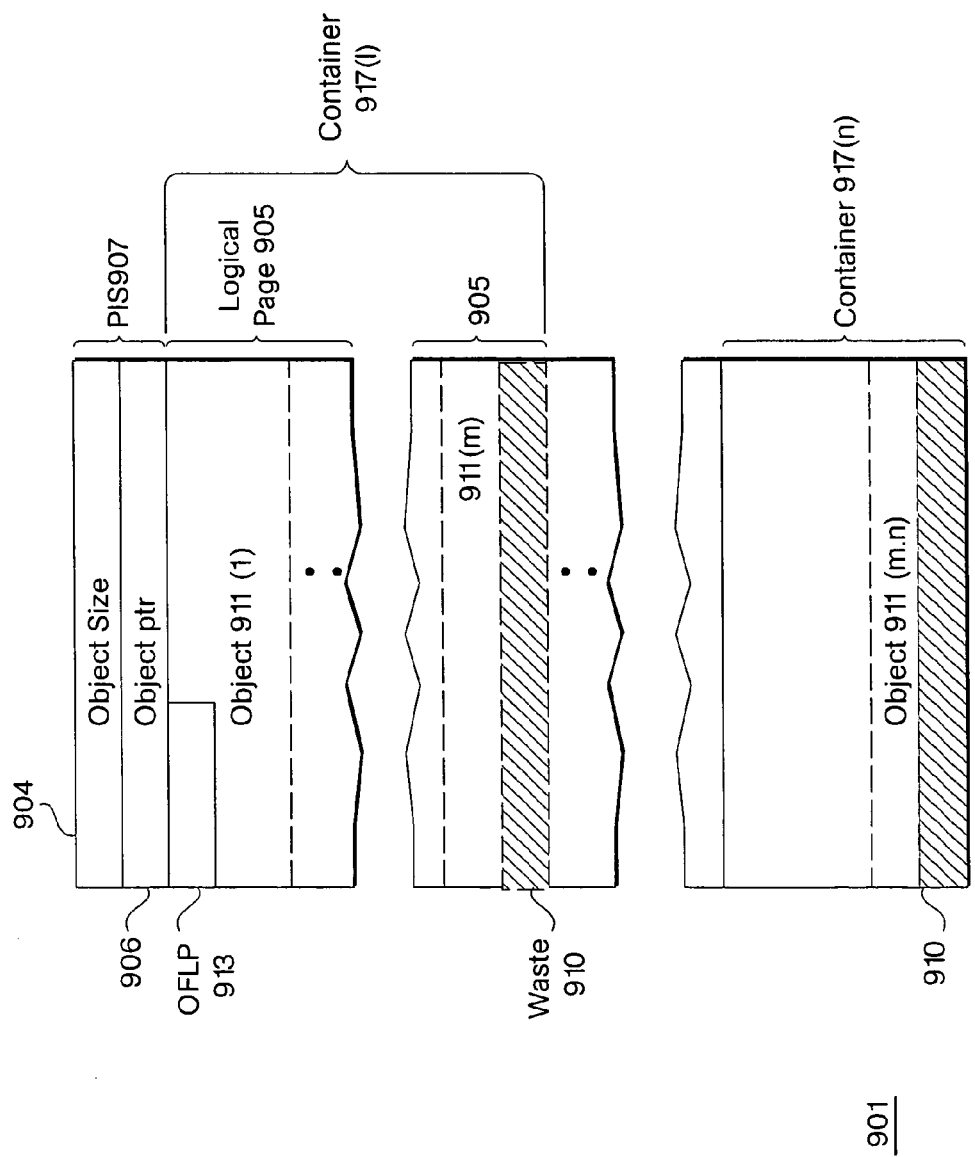
FIG. 9 shows how buckets for objects are organized.

Medium Objects: FIG. 9

Medium objects reduce fragmentation by providing a better fit between the objects being allocated and the container which holds them. In Boehm's allocator, the container size for all objects which are smaller than or equal to a page is a page; for all objects which are larger than a page, the container is the minimum number of pages required to contain the object. An important drawback of this approach is that the internal fragmentation with small objects that do not fit well into a single page or large objects that do not fit well into a multiple of pages can be very large. For example, if a small object is a little larger than half a page size, almost half of the page which contains it will be wasted, and if a large object is a little larger than a page, almost the entire second page will be wasted. Since we found that these allocation sizes happen to be the common case for many applications, we decided to add free lists with medium objects, that is, free lists whose containers are some number of consecutive pages, with the number of consecutive pages for a given free list being chosen such that objects of the size contained in the free list fit compactly into the container.

The benefits of medium objects can be seen from the following example: let us assume that there is a request to allocate an object of 2050 bytes in a system that has a page size of 4096. In an allocator that allocates only from free lists of small and large objects, an object of such a size is a small object, but only one such small object will fit in a single page, and consequently, the allocator will return an object of 4096 bytes because the page cannot be subdivided into any smaller equal-size portions that will contain the object to be allocated. An allocator that uses medium objects can divide a container made up of two consecutive pages into 3 objects of size 2730 bytes (plus 2 spare bytes that cannot be divided), and return one of these objects. In the first case, 2046 bytes are wasted, and in the second case only 680 bytes are wasted.

To put the above more formally, the internal fragmentation is the percentage of wasted space for a given object size. It can be computed by subtracting the requested object size from the real size of the object returned by the allocator and dividing the result by the real size.

$$\% \text{ Fragmentation} = 100.0 * (realSize - requestedSize) / realSize$$

As one would expect from the foregoing, in an allocator without medium objects, the fragmentation for objects with sizes around the size of the page approaches 50%. Especially at sizes 2049 and 4097 bytes (one byte after half the page size and one byte after the page size) the fragmentation reaches 50%. With medium objects however, the internal fragmentation for these sizes may be bounded to lower levels, with the bounds depending on the fit between the sizes of small and medium objects and their containers.

The memory allocator of Great Circle allocates objects out of three kinds of containers: small objects are allocated out of single-page containers. Medium objects are allocated out of containers that are made of consecutive pages. Large objects are objects for which more than one page is allocated. The small and medium object allocators have a separate bucket for each of the sizes of objects that they allocate. Each of the buckets is what is termed a segregated free list. See Paul R. Wilson, Mark S. Johnstone. Michael Neely, and David Boles, *Dynamic Storage Allocation: A survey and Critical Review*, available for anonymous FTP from cs.utexas.edu in /pub/garbage/ in October, 1998.

FIG. 9 shows the structure of a bucket 901. Each bucket 901 is made up of a page information structure 907 which includes information 904 indicating the size of the objects that will be allocated from the bucket and a free list pointer 906 indicating the head of the list of unallocated objects 911 contained in bucket 901. The objects 911 are stored in one or more containers 917, which are made up of one or more contiguous logical pages 905. The size of the container is the number of logical pages 905 which reduces waste 910 to a minimum for the size of object 911 stored in the bucket. Each object 911(*i*) which has not yet been allocated has an object free list pointer 913 pointing to the next unallocated object 911. When an object is allocated, the free list pointer 913 is overwritten by data and free list pointer 906 is set to point to the next unallocated object 911 in the list. When an object is freed, the allocator to which the bucket belongs links the freed object in at the head of the free list. This has the advantage that an object that has been used tends to be reused before it is removed from the caches in the machine that the program that uses the object is executing on. When a bucket 901 runs out of unallocated objects 911, the allocator that uses the bucket obtains an additional container 917 for the bucket from the large object allocator.

Figure 11:
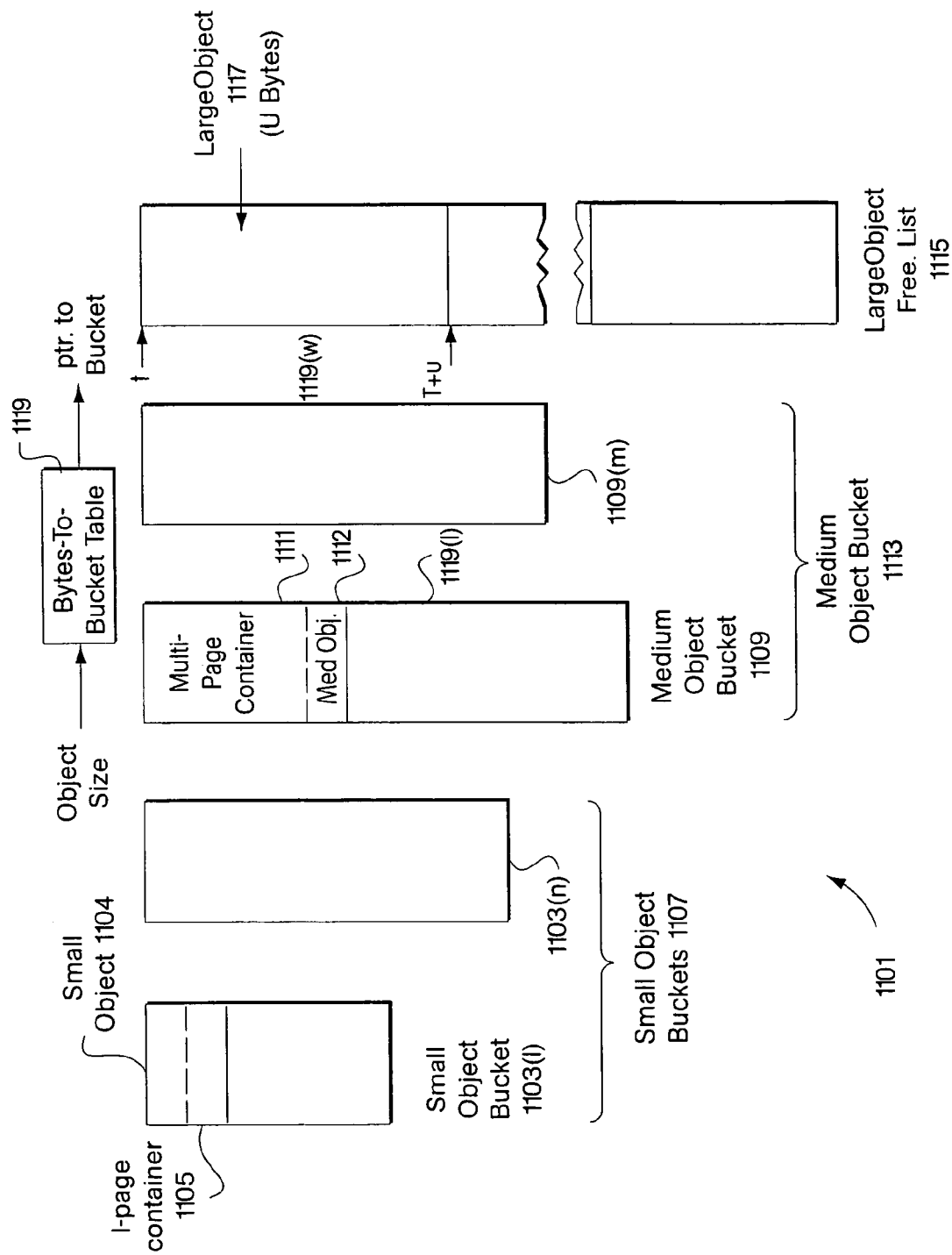
FIG. 11 shows how object buckets are organized in a preferred embodiment.

FIG. 11 shows small object buckets, medium object buckets, and large object free list as they may be employed in a memory allocation system that employs small and medium objects. There is a set of small object buckets 1107 for small objects 1104, that is objects that have sizes such that they fit into a 1-page container 1105 with little waste. Each small object bucket 1103 contains small objects of a single size.

There is further a set of medium object buckets 1113 for medium objects 1112, that is, objects that have sizes such that they fit into a multi-page container 1111 with little waste. Again, each medium object bucket 1109 contains medium objects of a single size, and the size of multi-page container 11 is chosen to minimize waste for the size of medium object in bucket 1109.

Large object free list 115, finally, can be seen as a free list in which each large object to be allocated has its own bucket that contains the number of pages required to allocate the large object. Large object free list 115 is a list of free logical pages that is ordered by address. Ordering by address permits coalescing of objects that are returned to the large object free list. The allocator satisfies a request for a large object by returning the first block of pages in the free list that is large enough to accommodate the large object. Access by the allocator to the buckets and large object free list is speeded up by bytes-to-bucket table 1119, which maps the size of an object to be allocated in bytes to the bucket which contains the objects into which the object to be allocated fits most closely or to the free list if the object is larger than the largest medium object.

A preferred embodiment sets up buckets 1107 and 1113 as required by the page sizes and data granularities of the system that the allocator is allocating memory for. The algorithm first sets up small object buckets for single-word objects and objects containing 1 to 8 double words; then the algorithm sets up buckets for objects of increasing size up to 1 page. For each size, the algorithm determines how much waste will results if a small object bucket 1107 is made for the size, and if the waste is above a threshold, the algorithm determines the size of container required for a medium object bucket for the object and sets up the medium object bucket. It should be noted here that medium objects need not be less than a page in size. For example, if objects of a size of 1⅓ pages were common, it might be worthwhile to set up a medium object bucket that had a container size of four pages.

Figure 10:
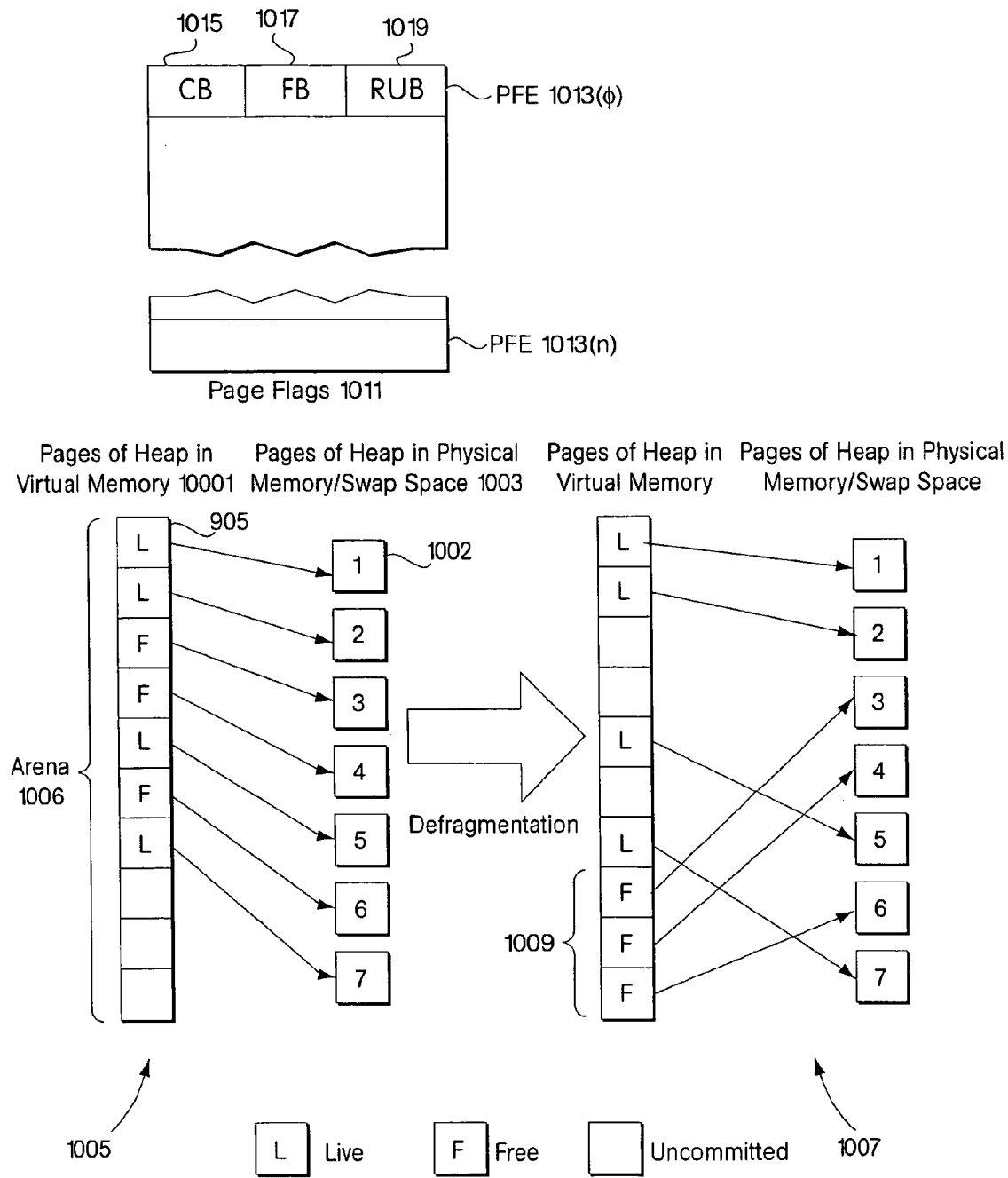
FIG. 10 shows free list defragmentation and footprint reduction.

Free List Defragmentation and Footprint Reduction: FIG. 10

The second technique reduces fragmentation in free list 1115 of large objects. Notice that the small and medium object buckets 1107 and 1113 are relatively unaffected by external fragmentation, because the free elements in a small or medium object bucket are always large enough to satisfy an allocation request where the object being allocated is taken from the bucket. In addition, the technique can also uncommit physical memory pages to which logical memory pages in the free list are mapped, allowing long-running programs to reduce their swap space requirements when their memory requirements decrease.

Free list defragmentation is based on the observation that moving collectors make the free memory space contiguous by moving the live data. However, the free memory space by definition contains no live data; consequently, it can be made contiguous simply by committing the physical pages corresponding to the free memory space to a different portion of the virtual address space where the free memory space will have contiguous virtual addresses. This provides a major defragmentation benefit of moving collection without the complexity, restrictions, or expense of moving data and updating pointers.

FIG. 10 shows how defragmentation works. On the left side, there is a representation 1005 of the heap in virtual memory and in physical memory prior to footprint reduction. The heap is part of an arena 1006 which is a range of contiguous virtual addresses. Arena 1006 is subdivided into logical pages 905, some of which have physical pages 1002 committed to them in the swap space. Prior to defragmentation, seven logical pages 905 have physical pages 1002 committed to them; four of the pages, indicated by L, contain live data; three of the pages, indicated by F, are free: three pages with free objects, and three pages, indicated by the fact that they are blank, are uncommitted, i.e., do not have swap space assigned. The three free logical pages 905 do not occupy consecutive locations in the virtual address space, and therefore a request to the allocator for a three-page object cannot be satisfied with the available free logical pages. Defragmentation de-commits the physical pages 1002 from the three free non-consecutive logical pages 905 to which they are committed in representation 1005, making them available to be committed to consecutive logical pages 905, as shown at 1009 in representation 1007. The large object can thus be allocated from the pages at 1009 without increasing the swap space.

To implement defragmentation and footprint reduction, the pages of the heap are represented by an array of bytes called page-flags, where each byte represents a page. Every bit in a byte represents a different characteristic of the page. For defragmentation and footprint reduction, only three bits in each byte are used: committed-bit, free-bit, and recently used-bit. The array is shown at 1011. There is a page flag entry 1011 for each logical page 905 in arena 1006; the relevant flags appear as committed bit 1015, free bit 1017, and recently-used bit 1019. Committed bit 1015 is used in the garbage collector's decommit barrier. Before the garbage collector references a logical page 905, it checks committed bit 1015 in the logical page's page flag entry and makes the reference only if the committed bit is set.

At initialization time, the allocator creates arena 1006 by mapping a large sequence of logical pages 905. This mapping operation reserves the virtual address space required for the logical pages, but does not commit swap space to any of the pages. Since the arena has been mapped, no other memory map operation will return a page in this range. However, since no swap space is reserved, a memory read/write operation to a word in this range of pages at this point in the execution of the program may result in a segmentation violation. Finally, all of the flags in the PFEs 1013 for logical pages 905 are cleared.

During a request for allocation of a large object, if the request cannot be satisfied with the existing objects in the free list, the allocator will do the following. It will search in page-flags 1011 for a set of free logical pages 905 in arena 1006 which are at contiguous locations in the virtual address space and which are together large enough to satisfy the request or some larger amount if the requested size is too small. Then it will call a virtual memory operation to commit swap space for this range of pages. The swap space of course includes the earlier decommitted physical pages 1002. The reason a larger amount is committed if the requested size is too small is to amortize the cost of the virtual memory operation. This range of pages is returned to the free list, the physical pages 1002 for the non-contiguous free logical pages 905 are committed to the contiguous free logical pages 905, and the corresponding committed-bits and free-bits in the PFEs 1013 for the logical pages 905 involved in the operation are updated. Finally, the allocation request is satisfied. If the number of consecutive uncommitted pages in arena 1006 is not enough, another large group of uncommitted memory is mapped and added to arena 1006.

Footprint reduction is done using recently-used bits 1019. Whenever a group of logical pages 905 is returned to the free-list, the corresponding recently used-bits and the free-bits are set. The recently used-bits tell the allocator that the corresponding page has been recently used and that it is not a good candidate for footprint reduction. During a footprint reduction, the physical pages 1002 corresponding to logical pages 905 whose recently-used bits 1019 are cleared are uncommitted from those logical pages 905, i.e., committed bits 1015 for the logical pages 905 are cleared and the swap space represented by the physical pages 1002 is returned to the operating system. When the execution of the program terminates, the recently used-bit is cleared for all of the logical pages 905 in its arena 1006.

The frequency with which footprint reduction is executed is linked to the activity of the allocator. In our implementation, a footprint reduction is performed after a pre-specified number of garbage collections. If a logical page 905 has remained on free list 901 during this pre-specified number of garbage collections, its physical page 1002 is uncommitted and returned to the operating system. Programs that explicitly manage their memory will run a footprint reduction after a pre-specified number of bytes have been explicitly returned to the free-list. Alternatively Great Circle supplies a footprint reduction procedure that the program can explicitly call after periods of heavy allocation.

Alternatives to the commit/uncommit operations are the map/unmap operations. The difference is that the uncommit memory operations return the associated swap space to the operating system, however the address space range is kept. The unmap operation returns both the address space and the swap space to the operating system. We have decided to use the commit/uncommit operations over a contiguous uncommitted arena because it allows recycling address space. The map operation can return memory mappings that are not contiguous, resulting in a heap whose virtual address space has holes.

Another modification for footprint reduction is that during the allocation of large objects every search in free list 1115 always starts from the first block in the list. This will result in reusing the same large objects most of the time and leaving the least used objects at the end of the list. If a new search started where the previous one ended it would reuse all the objects in the list and would not give the opportunity for footprint reduction.

A good side effect of footprint reduction is that pages that are black-listed, and therefore cannot be used because they are being pointed by false pointers, are unmapped if they continue black-listed for several consecutive allocations. For details on black-listed pages, see Hans-Juergen Boehm, "Space-efficient conservative garbage collection". In *Proceedings of the 1993 SIGPLAN Conference on Programming Language Design and Implementation*, Albuquerque, N. Mex., June 1993. ACM Press, pages 197-206.

CONCLUSION

The foregoing Detailed Description has disclosed to those skilled in the arts to which it pertains how to make and use debugging systems in which a database system mediates between the debugger and the interface the user employs to see the results of execution of a program by a debugger. The Detailed Description has provided a detailed disclosure of a preferred embodiment in which the debugger is a memory debugger and the interfaces employed by the users include a CLI interface and a Web browser interface. It will, however, be immediately apparent to those skilled in the relevant arts that debugging systems of the type described herein may be made using any type of interactive debugger and any type of user interface. Moreover, the database may be implemented using a commercially-available database system, as well as one designed specifically for the debugging system. The manner in which the debugger, the debugging system, and the user interface components interact will of course depend on the requirements of the debugging system and the capacities of the database system. The process architecture of the debugging system may similarly vary between one extreme in which all components execute in a single process and another extreme in which each component consists of one or more processes. The Detailed Description has further included details of the HTML pages used in a preferred embodiment; however, what is on an HTML page in a system that is built according to the principles disclosed herein and that employs a Web browser as a user interface will depend on the nature of the debugging being done and the taste of the designer of the HTML pages.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A debug apparatus comprising:
   a debug system comprising a debug client configured to interact with a program during execution of the program and to extract execution state corresponding to the program, wherein the debug client is configured to generate one or more first update queries including the execution state;
   a database server system coupled to receive the one or more first update queries from the debug system, the database server system comprising a database and configured to store the execution state in the database in an execution state section of the database; and
   a user system comprising a user interface client configured to receive user input and coupled to the database server system, the user interface client configured to generate a first read query responsive to the user input;
   wherein the database server system is configured to respond to the first read query with execution state stored in the execution state section of the database; and
   wherein the database includes a control section separate from the execution state section, and wherein the control section comprises an interface between the user interface client and the debug client for passing one or more commands between the user interface client and the debug client, wherein the user interface client is configured to generate one or more second update queries to write the one or more commands to the control section, and wherein the database server system is configured to write the one or more commands to the control section responsive to the one or more second update queries, and wherein the debug client is configured to generate one or more second read queries to read the one or more commands from the control section, and wherein the database server system is configured to return the one or more commands from the control section in response to the one or more second read queries, and wherein the debug client is configured to generate one or more third update queries to write one or more debugger event messages to the control section, and wherein the database server system is configured to write the one or more debugger event messages to the control section responsive to the one or more third update queries, and wherein the user interface client is configured to generate one or more third read queries to read the one or more debugger event messages from the control section, and wherein the database server system is configured to return the one or more debugger event messages in response to the one or more third read queries.

2. The debug apparatus as recited in claim 1 wherein the database is configured to persistently store the execution state, and where the first read query is transmitted by the user interface client subsequent to execution of the program being terminated.

3. The debug apparatus as recited in claim 2 wherein the database is configured to store execution state corresponding to a plurality of distinct executions of the program.

4. The debug apparatus as recited in claim 1 wherein the database is divided into at least per-program data and per-execution data, wherein the per-execution data comprises the execution state.

5. The debug apparatus as recited in claim 4 wherein the per-program data comprises a symbol table corresponding to the program.

6. The debug apparatus as recited in claim 1 wherein the debug client is linked to the program prior to execution of the program.

7. A debug database system comprising:
   a database configured to store execution state corresponding to at least one execution of a program in an execution state section of the database; and
   a database server coupled to the database;
   wherein the database server is coupled to receive one or more first update queries from a debug client configured to interact with the program during execution of the program, the one or more first update queries comprising execution state, wherein the database server is configured to update the execution state section of the database with the execution state provided in the one or more first update queries;
   wherein the database server is coupled to receive a first read query from a user interface client, wherein the database server is configured to return execution state read from the execution state section of the database to the user interface client in response to the first read query; and
   wherein the database comprises a control section separate from the execution state section, and wherein the control section comprises an interface between the user interface client and the debug client for passing one or more commands between the user interface client and the debug client, wherein the database server is coupled to receive one or more second update queries from the user interface client to write the one or more commands to the control section, and wherein the database server is configured to write the one or more commands to the control section responsive to the one or more second update queries, and wherein the database server is coupled to receive one or more second read queries from the debug client to read the one or more commands from the control section, and wherein the database server is configured to return the one or more commands in response to the one or more second read queries, and wherein the database server is coupled to receive one or more third update queries from the debug client to write one or more debugger event messages to the control section, and wherein the database server is configured to write the one or more debugger event messages to the control section responsive to the one or more third update queries, and wherein the database server is coupled to receive one or more third read queries from the user interface client to read the one or more debugger event messages from the control section, and wherein the database server is configured to return the one or more debugger event messages in response to the one or more third read queries.

8. The debug database system as recited in claim 7 wherein the database is configured to persistently store the execution state, and where the first read query is received subsequent to execution of the program being terminated.

9. The debug database system as recited in claim 8 wherein the database is configured to store execution state corresponding to a plurality of distinct executions of the program.

10. The debug database system as recited in claim 7 wherein the database is divided into at least per-program data and per-execution data, wherein the per-execution data comprises the execution state.

11. The debug database system as recited in claim 10 wherein the per-program data comprises a symbol table corresponding to the program.

12. A method comprising:
receiving one or more first update queries from a debug client configured to interact with a program during execution of the program, the one or more first update queries comprising execution state of the program;
updating an execution state section of a database with the execution state provided in the one or more first update queries;
receiving a first read query from a user interface client;
returning execution state read from the execution state section of the database to the user interface client in response to the first read query;
transmitting one or more commands from the user interface client to the debug client using a control section of the database that is separate from the execution state section, wherein the transmitting comprises:
  the user interface client generating one or more second update queries to write the one or more commands to the control section;
  writing the control section of the database responsive to the one or more second update queries;
  the debug client generating one or more second read queries to read the one or more commands from the control section; and
  returning the one or more commands to the debug client in response to the one or more second; and
transmitting one or more debugger event messages from the debug client to the user interface client using the control section of the database, wherein the transmitting comprises:
  the debug client generating one or more third update queries to write one or more debugger event messages to the control section;
  writing the one or more debugger event messages to the control section responsive to the one or more third update queries;
  the user interface client generating one or more third read queries to read the one or more debugger event messages from the control section; and
  returning the one or more debugger event messages from the control section responsive to the one or more third read queries.

13. The method as recited in claim 12 further comprising storing execution state corresponding to a plurality of distinct executions of the program in the database.

* * * * *